(12) United States Patent
Wiwatowski et al.

(10) Patent No.: US 11,383,370 B2
(45) Date of Patent: Jul. 12, 2022

(54) MULTI-FUNCTION PLIERS

(71) Applicant: Fiskars Brands, Inc., Middleton, WI (US)

(72) Inventors: Jeffrey Robert Wiwatowski, Oregon City, OR (US); Seth Patrick Jaramus, Portland, OR (US)

(73) Assignee: FISKARS BRANDS, INC., Middleton, WI (US)

( * ) Notice: Subject to any disclaimer, the term of this patent is extended or adjusted under 35 U.S.C. 154(b) by 575 days.

(21) Appl. No.: 16/311,616

(22) PCT Filed: Jun. 16, 2017

(86) PCT No.: PCT/US2017/037840
§ 371 (c)(1),
(2) Date: Dec. 19, 2018

(87) PCT Pub. No.: WO2017/222926
PCT Pub. Date: Dec. 28, 2017

(65) Prior Publication Data
US 2019/0232479 A1 Aug. 1, 2019

Related U.S. Application Data

(60) Provisional application No. 62/353,473, filed on Jun. 22, 2016.

(51) Int. Cl.
*B25B 7/14* (2006.01)
*B25F 1/02* (2006.01)
(Continued)

(52) U.S. Cl.
CPC ............... *B25F 1/02* (2013.01); *B25B 7/08* (2013.01); *B25B 7/14* (2013.01); *B25B 7/22* (2013.01);
(Continued)

(58) Field of Classification Search
CPC .... B25F 1/02; B25F 1/003; B25F 1/00; B25B 7/08; B25B 7/12; B25B 7/14; B25B 7/16;
(Continued)

(56) References Cited

U.S. PATENT DOCUMENTS

| 651,082 A | 6/1900 | McClary |
| 682,701 A | 9/1901 | Howland |

(Continued)

FOREIGN PATENT DOCUMENTS

WO WO-01/10610 A1 2/2001

OTHER PUBLICATIONS

International Search Report and Written Opinion for International Application No. PCT/US2017/037840, dated Oct. 17, 2017, 11 pages.

(Continued)

*Primary Examiner* — Robert J Scruggs
(74) *Attorney, Agent, or Firm* — Foley & Lardner LLP

(57) ABSTRACT

A multi-function tool includes a first handle, a second handle, a first cutting insert, and a second cutting insert. The first handle is pivotally coupled to the second handle at a pivoting axis. The first handle and the second handle move between an open position and a closed position relative to each other. A first insert surface is formed on the first handle, and a second insert surface is formed on the second handle. The first cutting insert includes a front side, a rear side configured to interface with the first insert surface, a left side including a flat anvil surface, and a right side including a cutting edge. A second cutting insert includes a front side, a rear side configured to interface with the second insert surface, a left side including a flat anvil surface, and a right side including a cutting edge.

3 Claims, 11 Drawing Sheets

(51) Int. Cl.
  *B25B 7/22* (2006.01)
  *B25B 7/08* (2006.01)
  *B26B 1/04* (2006.01)
  *B26B 17/00* (2006.01)
  *B25F 1/00* (2006.01)
  *B23D 29/02* (2006.01)

(52) U.S. Cl.
  CPC ............. *B26B 1/04* (2013.01); *B26B 17/00* (2013.01); *B23D 29/023* (2013.01); *B25F 1/003* (2013.01)

(58) Field of Classification Search
  CPC ........... B25B 7/22; B25B 13/14; B25B 13/26; B26B 1/04; B26B 17/00; B23D 29/023; A61B 17/82
  See application file for complete search history.

(56) References Cited

U.S. PATENT DOCUMENTS

| | | | |
|---|---|---|---|
| 844,134 A | 2/1907 | Jenkins | |
| 1,373,555 A | 4/1921 | Graham | |
| 2,504,766 A | 4/1950 | Vosbikian | |
| 3,235,964 A | 2/1966 | Young | |
| 3,357,287 A * | 12/1967 | Wertepny | B25B 7/18 81/322 |
| 4,750,267 A | 6/1988 | Boyd | |
| 4,773,288 A * | 9/1988 | Jang | B25B 7/10 81/409.5 |
| 4,947,553 A * | 8/1990 | Bendickson | A01G 3/02 30/262 |
| 5,822,866 A | 10/1998 | Pardue | |
| 5,862,552 A | 1/1999 | Koelewyn | |
| 6,276,063 B1 | 8/2001 | Chen | |
| 6,418,626 B1 * | 7/2002 | Jang | B26B 13/16 30/341 |
| 6,503,137 B2 | 1/2003 | Maille | |
| 6,708,359 B2 | 3/2004 | Butts | |
| 6,725,546 B1 | 4/2004 | Dallas et al. | |
| 6,966,244 B2 | 11/2005 | Herbst et al. | |
| 7,908,944 B2 | 3/2011 | Nason et al. | |
| 8,171,645 B2 | 5/2012 | Duey | |
| 8,549,757 B2 | 10/2013 | Wu | |
| 2005/0144788 A1* | 7/2005 | Lake | B26B 1/046 30/160 |
| 2006/0150418 A1 | 7/2006 | Hsieh | |
| 2007/0221016 A1 | 9/2007 | Herbst et al. | |
| 2010/0236078 A1 | 9/2010 | Duey | |
| 2011/0030145 A1 | 2/2011 | Mandic | |

OTHER PUBLICATIONS

English Translation of Office Action Received for Chinese Application No. 201780037961.1, dated Jan. 3, 2020, 11 pages.

* cited by examiner

MULTI-FUNCTION PLIERS

CROSS-REFERENCE TO RELATED PATENT APPLICATIONS

This application claims the benefit of U.S. Provisional Patent Application No. 62/353,473, filed Jun. 22, 2016, which is incorporated herein by reference in its entirety.

BACKGROUND

The present application relates generally to the field of multi-function tools. Multi-function tools typically include a pair of handles and an implement such as a wrench, pair of scissors, or pliers, along with a number of ancillary tools used to perform any number of tasks, including wire cutters. After damaged or dulled, typical wire cutter inserts must be replaced by a replacement set of cutter inserts. This requires a user to always carry additional cutter inserts while using the tool. Additionally, typical multi-function tools include locks that pivot freely and can engage into the lock position when not desired. Thus, the typical multi-function tools with freely-pivoting locks can obstruct the functionality of the tool.

SUMMARY

One embodiment relates to a multi-function tool including a first handle, a second handle, a first cutting insert, and a second cutting insert. The first handle is pivotally coupled to the second handle at a pivoting axis. The first handle and the second handle move between an open position and a closed position relative to each other. A first insert surface is formed on the first handle proximate the pivoting axis, and a second insert surface is formed on the second handle proximate the pivoting axis. The first cutting insert includes a first front side, a first rear side configured to interface with the first insert surface when attached to the first handle, a first left side including a first flat anvil surface, and a first right side including a first cutting edge. A second cutting insert includes a second front side, a second rear side configured to interface with the second insert surface when attached to the second handle, a second left side including a second flat anvil surface, and a second right side including a second cutting edge.

Another embodiment relates to a multi-function tool including a first handle including a pocket having a pocket wall, a second handle including an aperture, a second handle including an aperture, a lock button movable between an unlocked position and a locked position, a lock plate configured to hold the lock button within the aperture, and a biasing member configured to bias the lock button toward the unlocked position. The first handle is pivotally coupled to the second handle. The first handle and the second handle move between an open position and a closed position relative to each other. The lock button includes a top portion, a bottom portion, and a shoulder. The shoulder is positioned between the top portion and the bottom portion. The biasing member is positioned on the bottom portion of the lock button between the lock plate and the shoulder. When in the locked position, the bottom portion of the lock button is slidably engaged with the pocket wall to lock the first handle and the second handle in the closed position.

Yet another embodiment relates to a multi-function tool including a first handle including a pocket having a pocket wall, a second handle including an aperture, a lock button movable between an unlocked position and a locked position, a biasing member configured to bias the lock button toward the unlocked position, and a lock ring. The second handle is pivotally coupled to the first handle. The first handle and the second handle move between an open position and a closed position relative to each other. The lock button includes a top portion and a bottom portion. When engaged, the lock ring covers the lock button in the locked position. When in the locked position, the bottom portion of the lock button is slidably engaged with the pocket wall to lock the first handle and the second handle in the closed position.

The invention is capable of other embodiments and of being practiced or being carried out in various ways. It is to be understood that the invention is not limited in its application to the details of construction and the arrangements of components set forth in the following description or illustrated in the drawings. Alternative exemplary embodiments relate to other features and combinations of features as may be generally recited in the claims.

DETAILED DESCRIPTION

Figure 1:
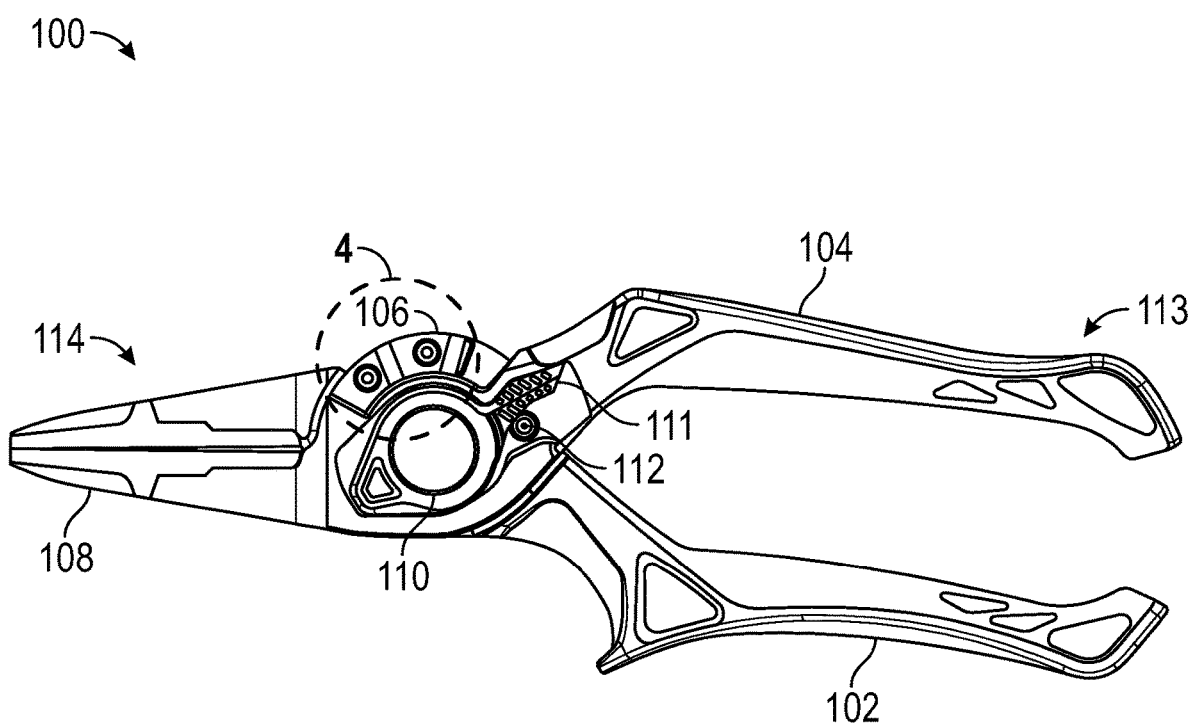
FIG. 1 is a front view of multi-functional pliers, according to an exemplary embodiment.
Figure 2:
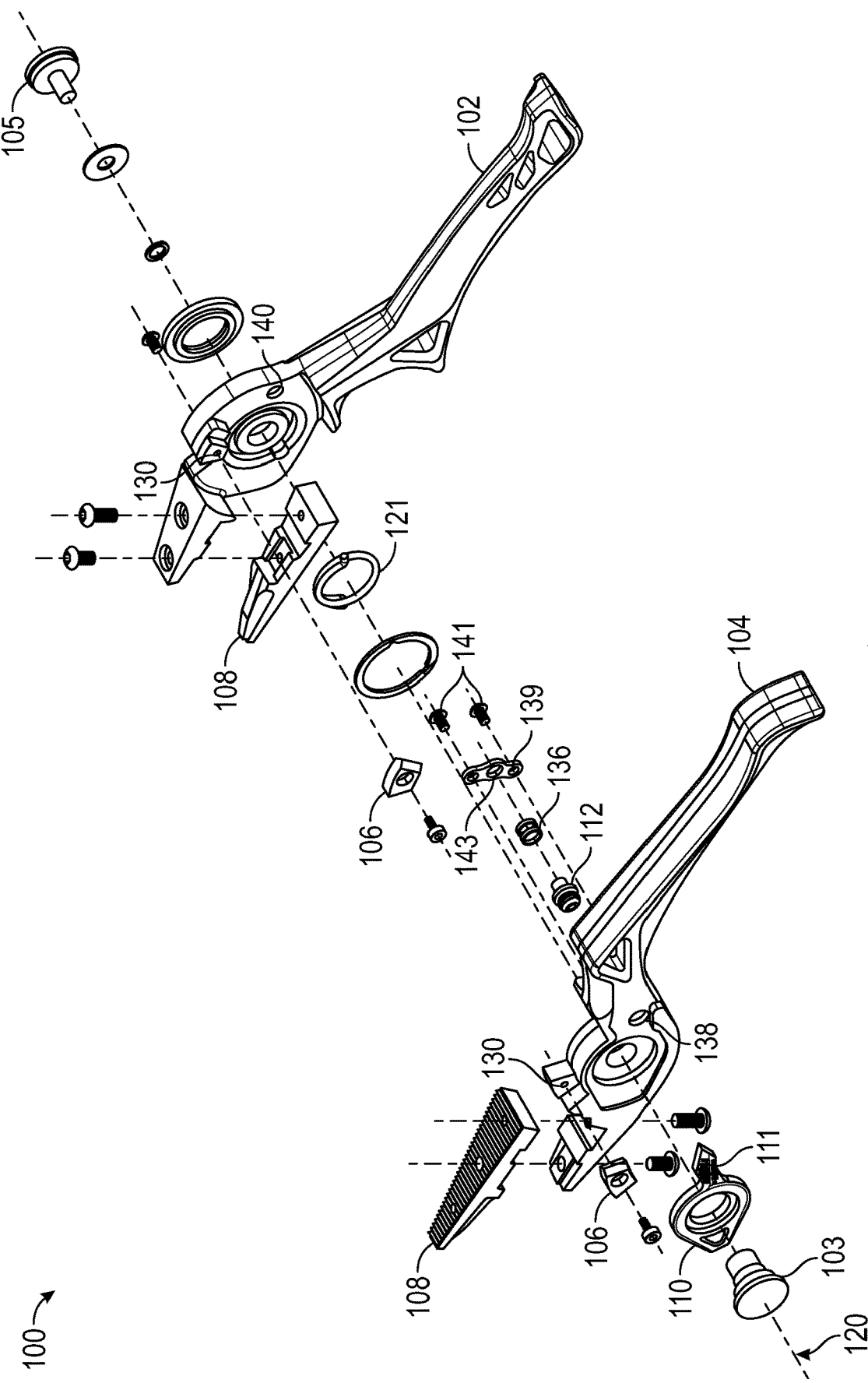
FIG. 2 is an exploded view of the multi-functional pliers of FIG. 1.
Figure 3:
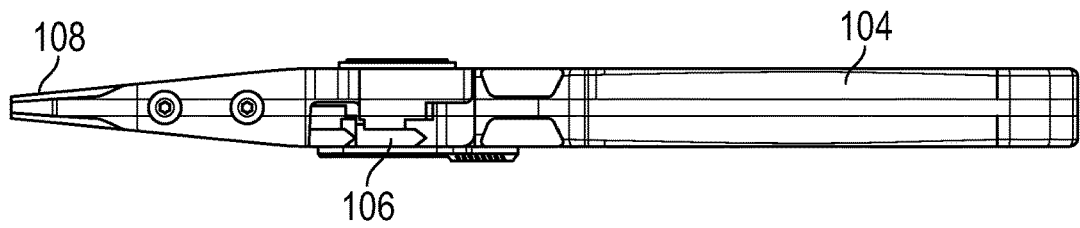
FIG. 3 is a top view of the multi-functional pliers of FIG. 1.

Referring to FIGS. 1-3, a multi-functional tool, shown and described as pliers 100, is shown according to an exemplary embodiment. The multi-functional pliers 100 are shown as having a first handle 102 and a second handle 104. As shown in FIGS. 1 and 3, the first and second handles 102, 104 both include a handle portion 113 and a working portion 114. The working portion 114 can include various tools, such as pliers, scissors, a wrench, clamp, or any other suitable tools. Various embodiments of multi-functional pliers 100 include a handle portion 113 with handles having different shapes. The handles 102, 104 are pivotally connected at a pivoting axis 120 (FIG. 1) such that a user can pivot the handle portion 113 to move the working portion 114. In one embodiment, the pivoting axis 120 is located nearer the working portion 114 to provide torque to the working portion 114 from the handle portion 113. In other embodiments, the pivoting axis 120 can be placed at any location on the pliers 100. As a user closes the handle portion 113, the working portion 114 closes and as the user opens the handle portion 113, the working portion 114 opens. As shown in FIG. 2, the pliers include a biasing member, shown as torsion spring 121, configured to bias the handles 102, 104 in an open direction (i.e., toward an open position).

An axle 103 is coupled to an axle fastener 105 along the pivoting axis 120 to hold the first handle 102 and the second handle 104 together. In some embodiments, the axle 103 is a pressed into the first handle 102. As shown in FIG. 1, various washers may be placed in between the handles 102, 104 and the axle 103 and axle fastener 105. In one embodiment, the axle 103 is engaged with the second handle 104 along a pivoting axis 120 from a front side of the second handle 104 and the axle fastener 105 is engaged with the axle 103 along the pivoting axis 120 from a rear side of the first handle 102, thus mating the two handles 102, 104 together. In other embodiments, the first and second handles 102, 104 can be pivotally connected using other suitable mechanisms.

The multi-functional pliers 100 additionally include a pair of plier jaws 108. Although shown as flat-jaw type pliers in FIGS. 1 and 2, the plier jaws 108 can be of any other form including, but not limited to, needle-nose, smooth-jaw, C-clamp, and pincers. As shown in FIGS. 1 and 2, the plier jaws 108 are fastened to the handles 102, 104 by general-purpose fasteners (shown as button-type fasteners). Thus, in some embodiments, the plier jaws 108 may be removable and interchangeable such that the type of plier jaw can be changed and if the plier jaws 108 are broken or worn down, the plier jaws 108 can be replaced with new jaws.

Figure 4:
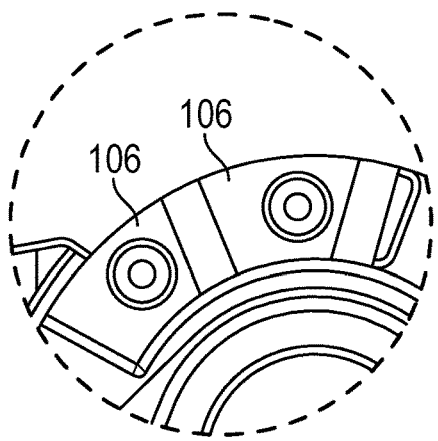
FIG. 4 is a more detailed view of section 3 of the multi-functional pliers of FIG. 1.
Figure 5:
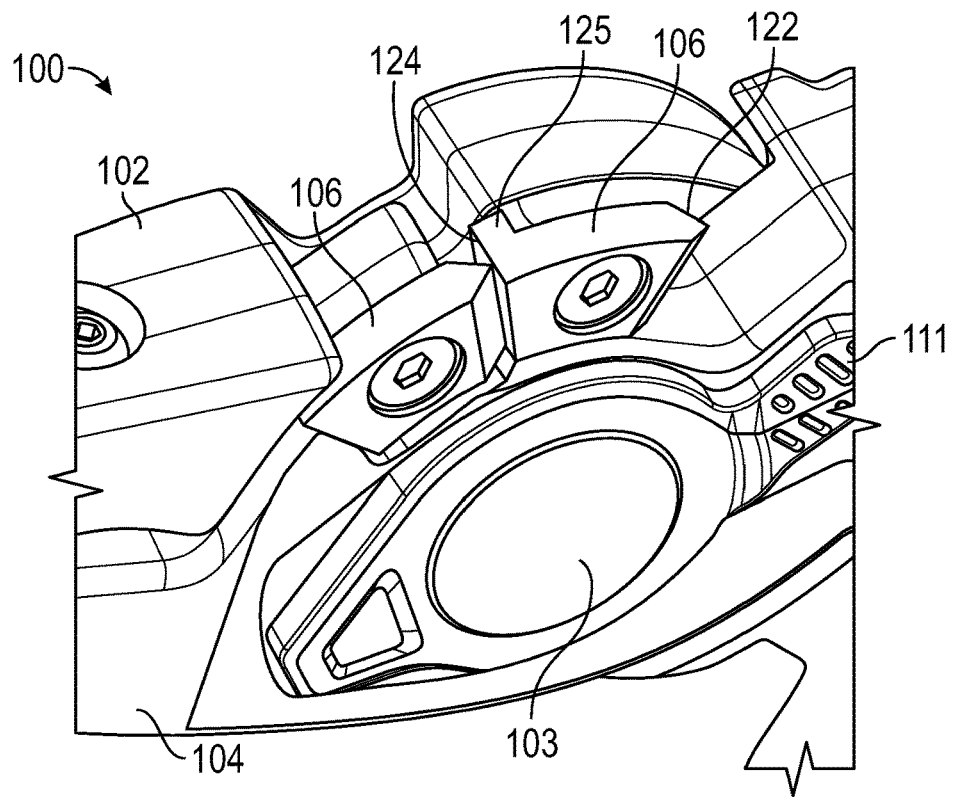
FIG. 5 is a perspective view showing a portion of the of multi-functional pliers of FIG. 1.

The multi-functional pliers 100 additionally include a pair of cutting inserts 106. The cutting inserts 106 are configured to cut a workpiece, such as a wire, line, cable, etc. As shown in FIGS. 4 and 5, the cutting inserts 106 are attached to the multi-functional pliers 100 such that the closing of the handles 102, 104 also close the cutting inserts 106 relative to one another. As the handles 102, 104 are opened, the cutting inserts 106 move away from one another. In one embodiment, the cutting inserts 106 are mounted on the multi-functional pliers 100 by one or more fasteners as shown in FIG. 1. In other embodiments, the cutting inserts 106 are otherwise coupled to the multi-functional pliers 100, such as by a snap feature.

Figure 6A:
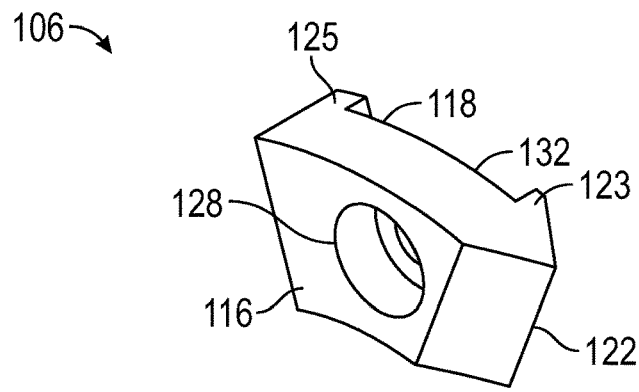
FIG. 6A is a perspective view of a cutting insert, according to an exemplary embodiment.
Figure 6B:
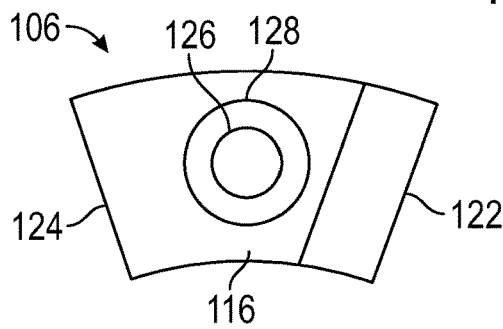
FIG. 6B is a front view of the cutting insert of FIG. 6A.
Figure 6C:
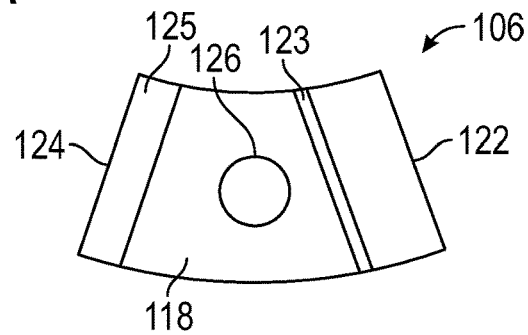
FIG. 6C is a rear view of the cutting insert of FIG. 6A.
Figure 7A:
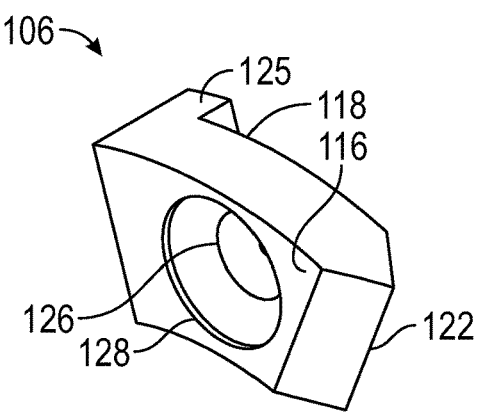
FIG. 7A is a perspective view of a cutting insert, according to an exemplary embodiment.
Figure 7B:
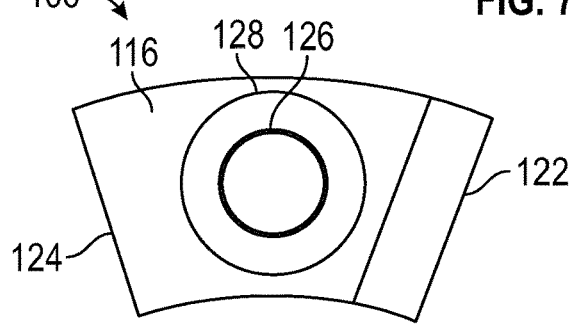
FIG. 7B is a front view of the cutting insert of FIG. 7A.
Figure 7C:
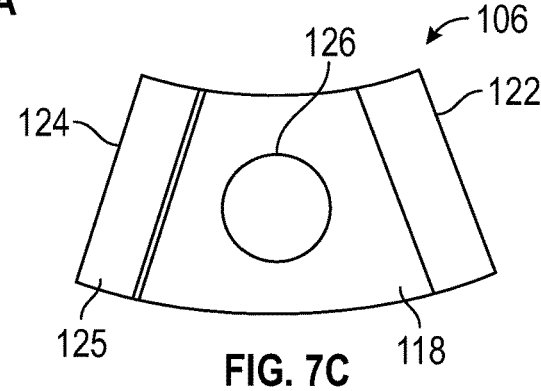
FIG. 7C is a rear view of the cutting insert of FIG. 7A.

As shown in FIGS. 6A-6C, the cutting inserts 106 include a front side 116 and a rear side 118. The rear side 118 includes a slot 132. The slot 132 interfaces with an insert surface 130 (shown in FIG. 2) on each of the handles 102, 104 when the cutting insert 106 is attached to the pliers 100. Each cutting insert 106 is shown to have an inset 128 on the front side 116 with a through hole 126 to receive the fasteners mentioned above. The inset 128 may be configured to receive a countersunk bolt, a cap screw, or another type of fastener. The cutting inserts 106 additionally include a cutting edge 122 and a flat anvil side 124. As shown in FIGS. 6A and 6C, the cutting inserts 106 include a cutting edge protrusion 123 and an anvil side protrusion 125 extending from the rear side 118. The cutting edge protrusion 123 follows the angled profile of the cutting edge 122, and the anvil side protrusion 125 follows the flat profile of the flat anvil side 124. The slot 132 is formed between the cutting edge protrusion 123, the anvil side protrusion 125, and the rear side 118. In an alternative embodiment, shown in FIGS. 7A-7C, the cutting inserts 106 include the anvil side protrusion 125 but omit the cutting edge protrusion 123. In this embodiment, the anvil side protrusion 125 and the rear side 118 interface with the insert surface 130. When the cutting inserts 106 are attached to the multi-functional pliers 100, the cutting edge 122 of one cutting insert 106 is configured to provide a cutting, compression, and/or slicing force to the flat anvil side 124 of the other cutting insert 106 in a closed position as shown in FIGS. 4 and 5.

The cutting inserts 106 are interchangeable such that in one configuration, the cutting edge 122 of a first insert 106 interfaces with the flat anvil side 124 of a second insert 106 in a closed position and in another configuration, the cutting edge 122 of the second insert 106 interfaces with the flat anvil side 124 of the first insert 106 in a closed position. Thus, when the cutting edge 122 of the first insert 106 is dull or damaged, the inserts can be removed from the pliers 100 and reversed such that the cutting edge 122 of the second insert 106 closes against the flat anvil side 124 of the first insert 106. In other embodiments, the cutting inserts 106 include cutting edges on both sides such that the cutting edges come together in closed position to cut a workpiece in either a slicing motion or shearing motion. Accordingly, no separate replacement inserts are needed for the first instance when a cutting insert 106 is dulled or damaged.

The multi-functional pliers 100 also include a locking mechanism 112, a biasing member 136, a lock plate 139, and a lock ring 110. The locking mechanism 112 includes a top portion 133 and a bottom portion 134. In an exemplary embodiment, the diameter of the top portion 133 increases toward the bottom portion 134. In other contemplated embodiments, the diameters of the top portion 133 and bottom portion 134 are the same. The locking mechanism 112 and the biasing member 136 are attached to the second handle 104 by a lock plate 139 fastened to the second handle 104 by at least one fastener 141.

Figure 10:
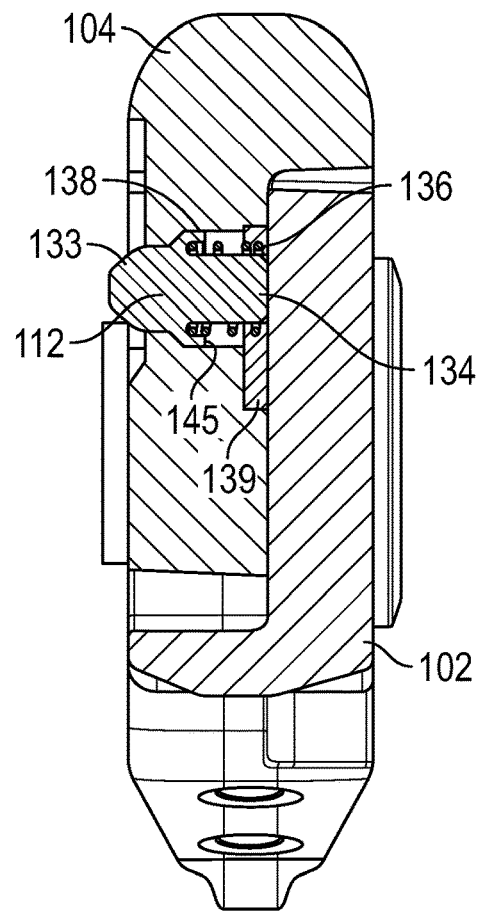
FIG. 10 is a section view of the multi-functional pliers of FIG. 9 taken along line 10-10.
Figure 11:
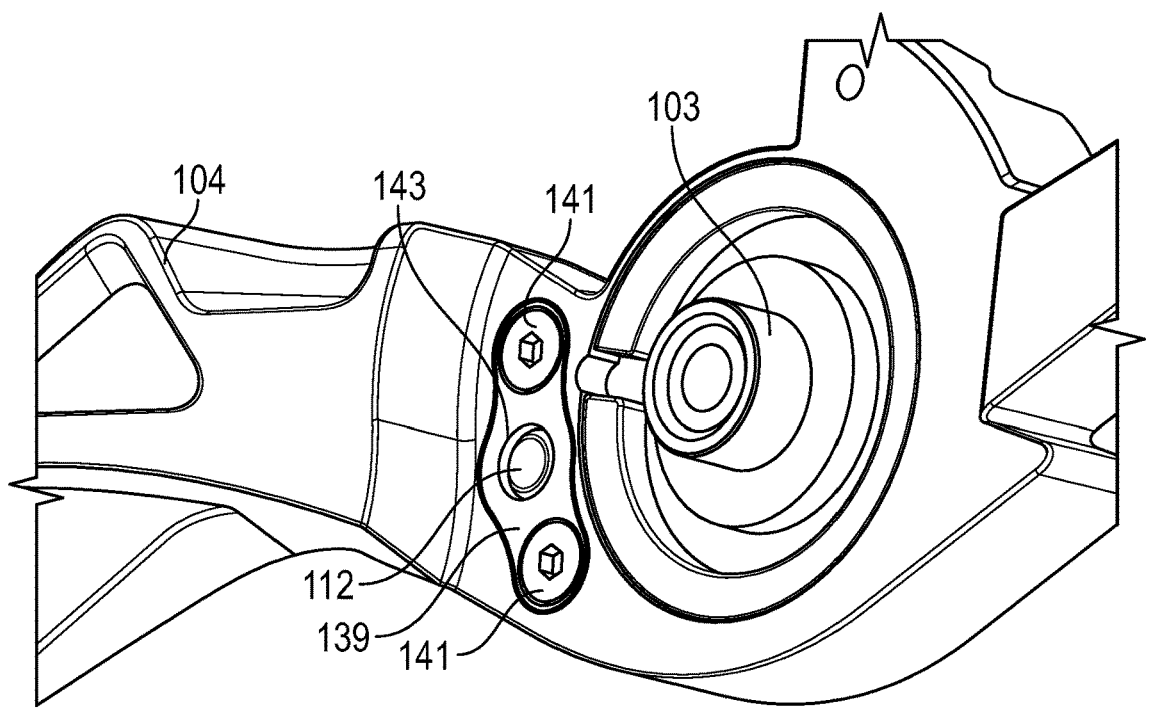
FIG. 11 is a perspective view of the multi-functional pliers of FIG. 1 with a handle removed.

As shown in FIGS. 10 and 11, the locking mechanism 112 includes a shoulder 145 positioned between the top portion 133 and the bottom portion 134 such that the shoulder 145 contacts the lock plate 139 and the locking mechanism 112 is held in place by the lock plate 139 on the second handle 104. The lock plate 139 includes an aperture 143 configured to slidably engage the bottom portion 134 of the locking mechanism 112. As discussed further herein, the aperture 143 of the lock plate 139 allows the bottom portion 134 to interact with a pocket 140 of the first handle 102. The second handle 104 also includes an aperture 138 with which the top portion 133 of the locking mechanism 112 is slidably engaged. As shown in FIG. 10, the aperture 138 is shaped such that the diameter of the top portion 133 fits within the aperture 138 in a disengaged position such that the locking mechanism 112 is held in place on the second handle 104 in a disengaged position. The aperture 138 is a first diameter near an outside face of the handle 104 a second, larger diameter near the face of the handle 104 that meets the handle 102. The first diameter is smaller than the shoulder 145, preventing the locking mechanism 112 from moving all of the way through the aperture 138.

The biasing member 136 is positioned around the bottom portion 134 and engaged with the shoulder 145 of the top portion 133. The positioning of the biasing member 136 on the bottom portion 134 of the locking mechanism 112 biases the locking mechanism 112 away from the first handle 102. When in the unlocked position, the biasing member 136 holds the bottom portion 134 out of the pocket 140 on the first handle 102. In FIG. 10, the biasing member 136 is shown as a spring. In other embodiments, the biasing member 136 can be any feature providing a biasing force to the locking mechanism 112.

The locking mechanism 112 is configured to lock the handles 102, 104 when in a closed position. In an exemplary embodiment, the lock ring 110 is configured to be used as a safety feature to ensure that the locking mechanism 112 is secured in a locked position. In some embodiments, the lock ring 110 is not included and the locking mechanism 112 is secured in the locked position without the use of the lock ring 110 due to friction between bottom portion 134 of the locking mechanism 112 and the pocket 140 of the first handle 102. In some such embodiments, a biasing force imparted by the torsion spring 121 forces the bottom portion 134 against a wall of the pocket 140, causing enough friction to overcome the biasing force of the biasing member 136. When the handles 102, 104 are moved (e.g., squeezed by a user), the biasing force of the torsion spring 121 is lessened, and the biasing member 136 forces the locking mechanism 112 to the unlocked position.

Figure 8:
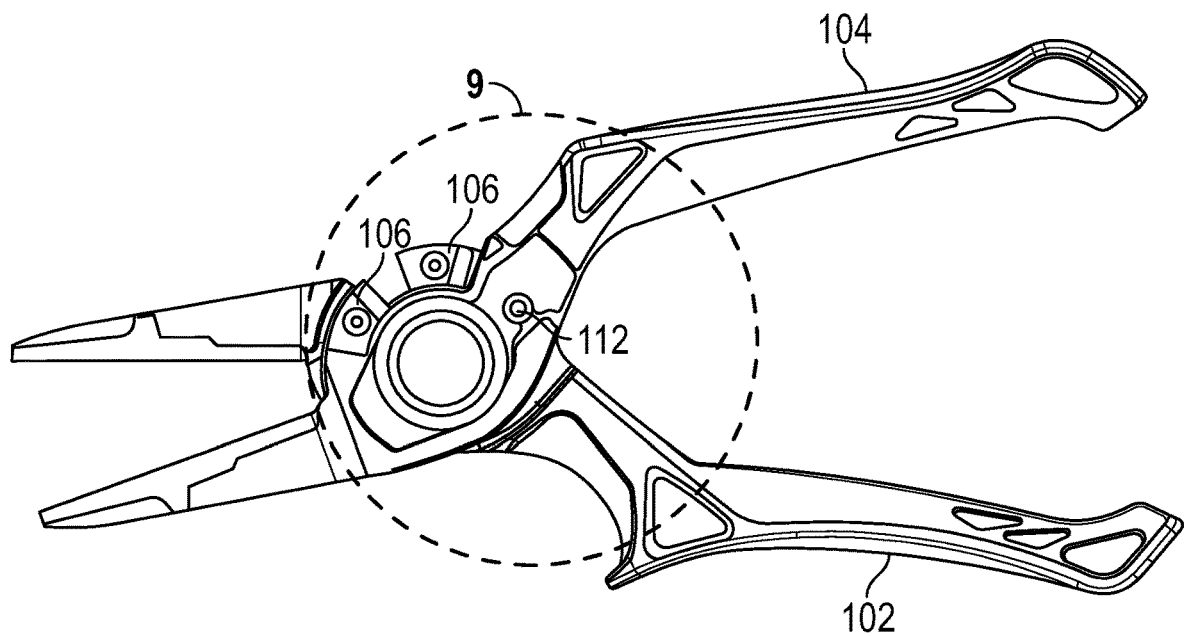
FIG. 8 is a front view of multi-functional pliers in an open position, according to an exemplary embodiment.
Figure 9:
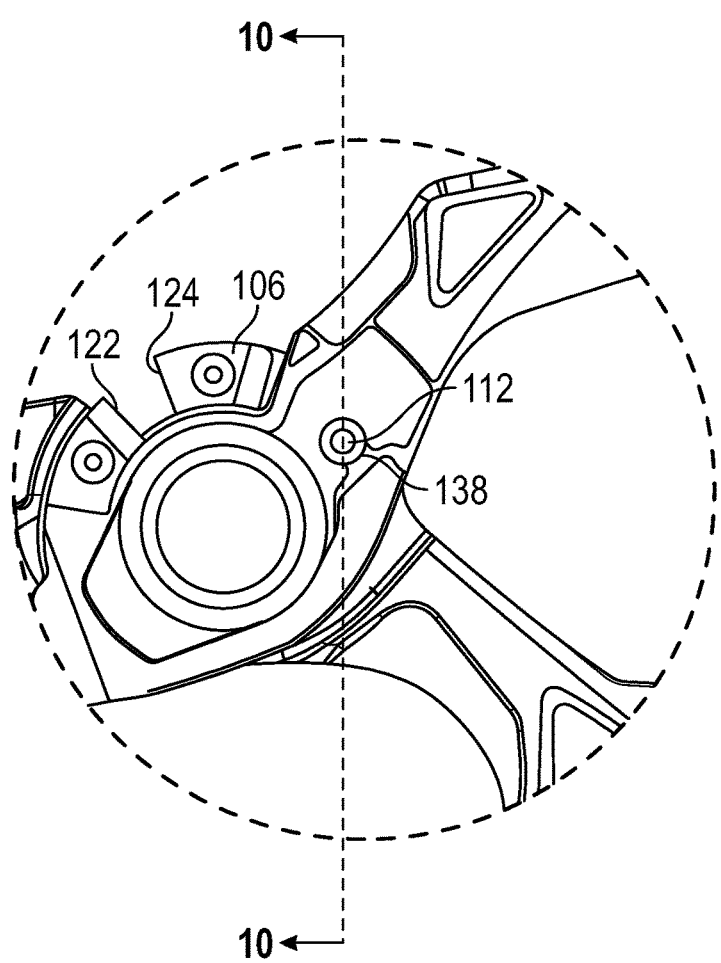
FIG. 9 is a more detailed view of section 9 of the multi-functional pliers of FIG. 8.

In some embodiments, for example in FIGS. 8-10, the multi-functional pliers 100 are operational without a lock ring 110. In FIG. 8, the handles 102, 104 are open, the plier jaws 108 are open relative to each other, and the cutting inserts 106 are separated from each other. As shown in FIG. 9, the cutting inserts 106 are separated such that there is a space between them to insert a workpiece (e.g., wire, line, cable, etc.) desired to be cut. FIG. 10 shows a section view of FIG. 9 taken along line 10-10. In this configuration, the handles 102, 104 are open such that the locking mechanism 112 is in an unlocked position. The locking mechanism 112 is shown inside of and slidably engaged with an aperture 138 on the second handle 104. As shown, the top portion 133 of the locking mechanism 112 protrudes out of the aperture 138 when in an unlocked position due to the biasing force of the biasing member 136.

Figure 12:
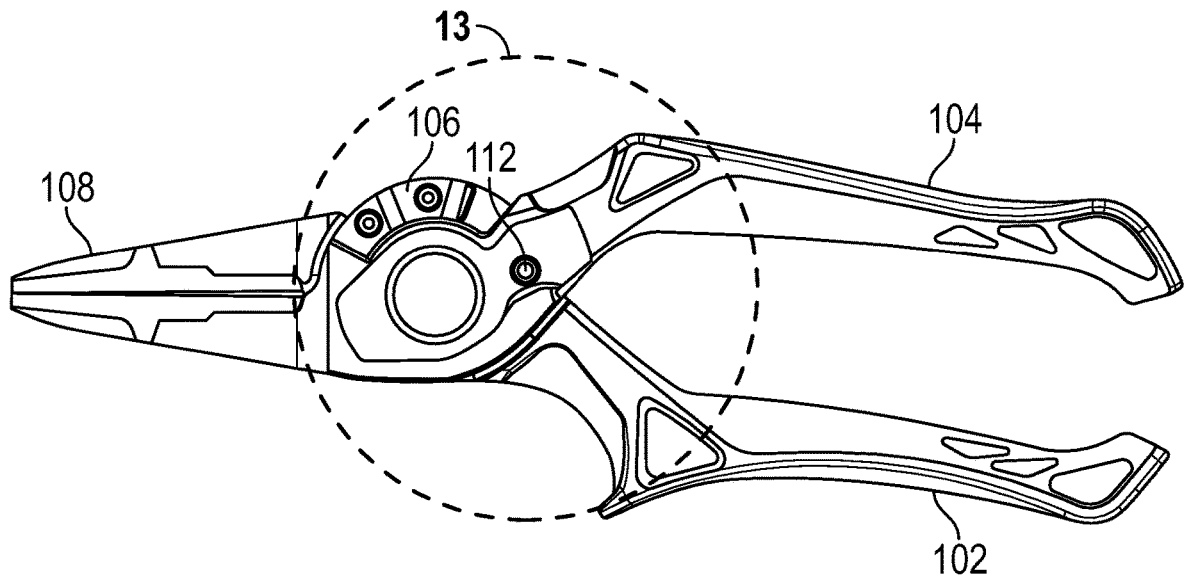
FIG. 12 is a front view of the multi-functional pliers of FIG. 8 in a closed position.
Figure 13:
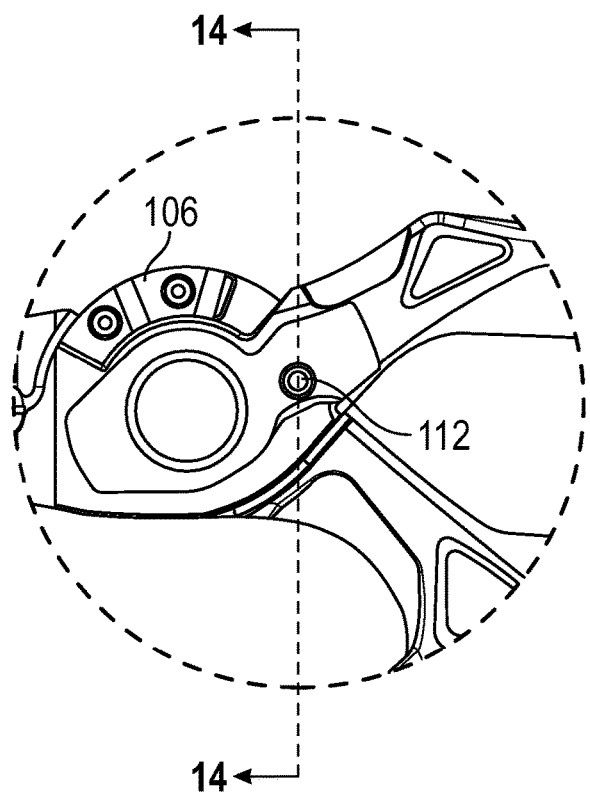
FIG. 13 is a more detailed view of section 13 of the multi-functional pliers of FIG. 12.
Figure 14:
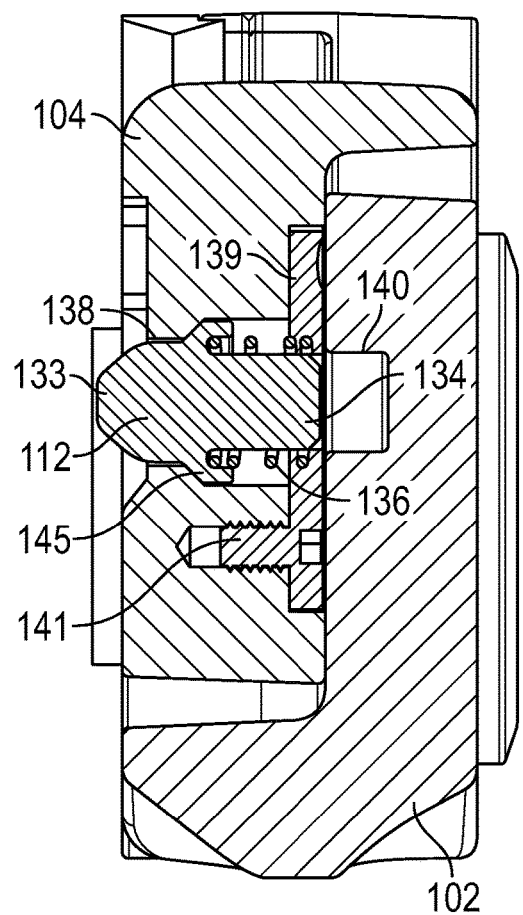
FIG. 14 is a section view of the multi-functional pliers of FIG. 13 taken along line 14-14.

FIGS. 12-14 show the multi-functional pliers 100 in a closed position and not including the lock ring 110. In FIG. 12, the handles 102, 104 are closed, the plier jaws 108 are closed relative to each other, and the cutting inserts 106 are closed such that the cutting edge 122 of one cutting insert 106 is abutting the flat anvil side 124 of the other insert 106. FIG. 14 shows a section view of FIG. 13 taken along line 14-14. As shown in FIG. 14, when the pliers 100 are in a closed position as described above, the aperture 138 of the second handle 104 lines up with the pocket 140 in the first handle 102 such that the bottom portion 134 of the locking mechanism 112 can slide into and out of the pocket 140 when the pliers 100 are closed. Shown in FIG. 14, in an unlocked configuration, the top portion 133 of the locking mechanism 112 is protruding out of the aperture 138 and the bottom portion 134 is not engaged with the pocket 140.

Figure 15:
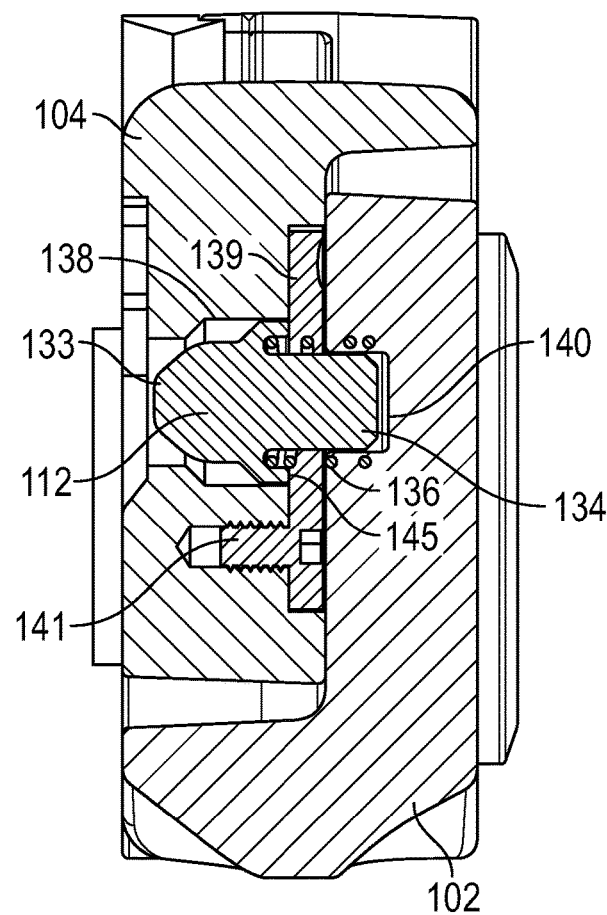
FIG. 15 is a section view of the multi-functional pliers of FIG. 13 taken along line 14-14, where the lock mechanism is engaged.

As shown in FIG. 15, in a locked configuration, the bottom portion 134 is inserted into the pocket 140 such that the handles 102, 104 cannot pivot into an open position. The contact between the walls of the pocket 140 and the bottom portion 134 of the locking mechanism 112 restricts the movement of the handles 102, 104. To engage the locking mechanism, a user presses on the top portion 133 of the locking mechanism 112, causing the bottom portion 134 to enter and engage with the walls of the pocket 140 in the first handle 102.

Figure 16:
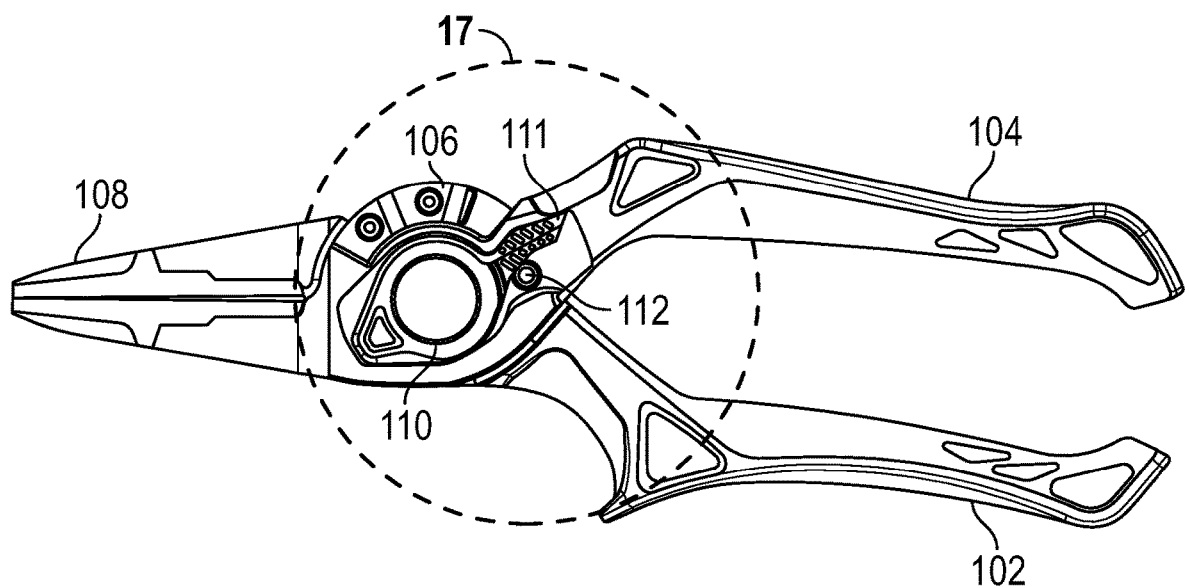
FIG. 16 is a front view of the multi-functional pliers of FIG. 1 in a closed position with the lock ring in a disengaged position.
Figure 17:
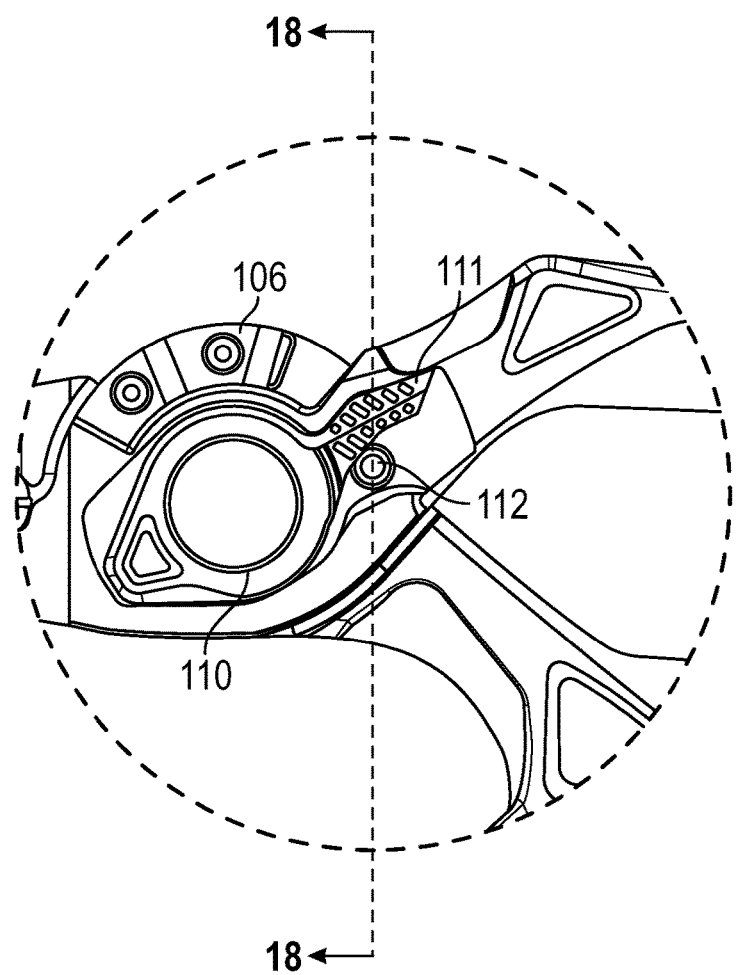
FIG. 17 is a more detailed view of section 17 of the multi-functional pliers of FIG. 16.
Figure 18:
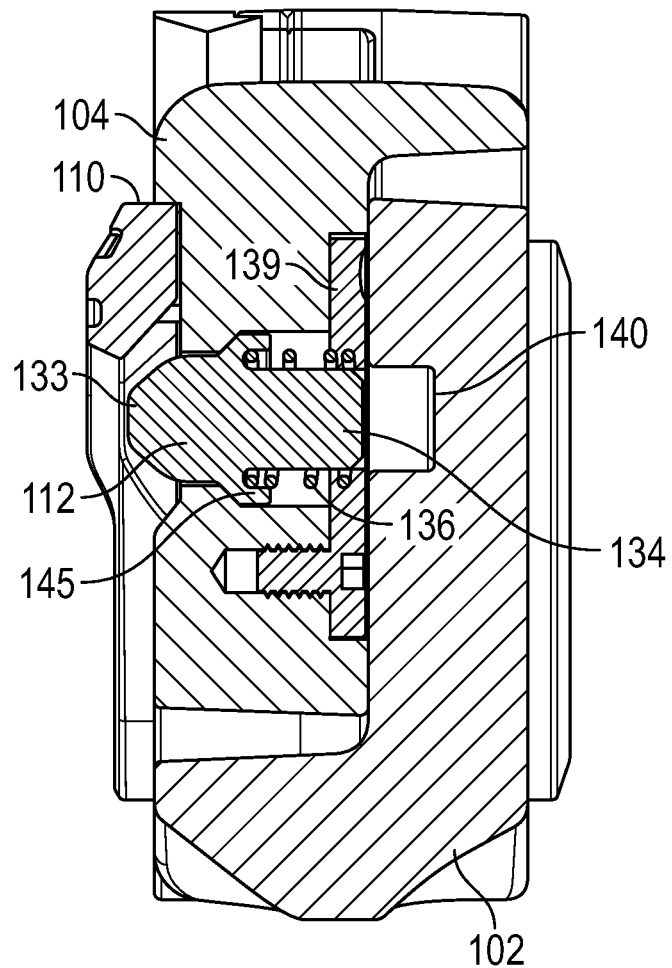
FIG. 18 is a section view of the multi-functional pliers of FIG. 17 taken along line 18-18.

Referring now to FIGS. 16-18, the multi-functional pliers 100 are shown in a closed position including the lock ring 110 in a disengaged position. The lock ring 110 is pivotally coupled to the first handle 102 by the axle 103. The lock ring 110 is configured to rotate about the pivoting axis 120 and includes a projection 111 configured to cover the locking mechanism 112 in a locked position when the lock ring 110 is in an engaged position. However, as shown in FIG. 16, when the lock ring 110 is in a disengaged position, the projection 111 is not covering the locking mechanism 112 and the locking mechanism 112 is exposed. In some embodiments, even as the lock ring 110 is not engaged, the locking mechanism 112 remains in a locked position until the handles 102, 104 are pivoted. In this embodiment, the friction between the bottom portion 134 of the locking mechanism 112 and the wall of the pocket 140 keeps the locking mechanism 112 in a locked position. In other embodiments, without engagement of the lock ring 110, the locking mechanism 112 is in an unlocked position with the bottom portion 134 out of engagement with the pocket 140 of the first handle 102.

Figure 19:
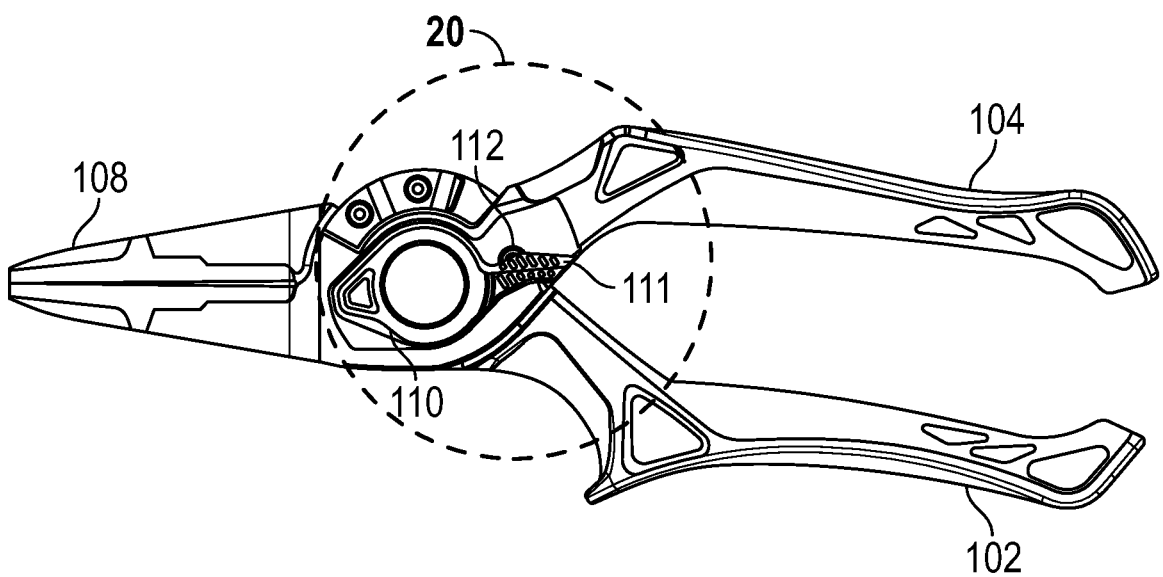
FIG. 19 is a front view of the multi-functional pliers of FIG. 1 in a closed position with the lock ring in an engaged position.
Figure 21:
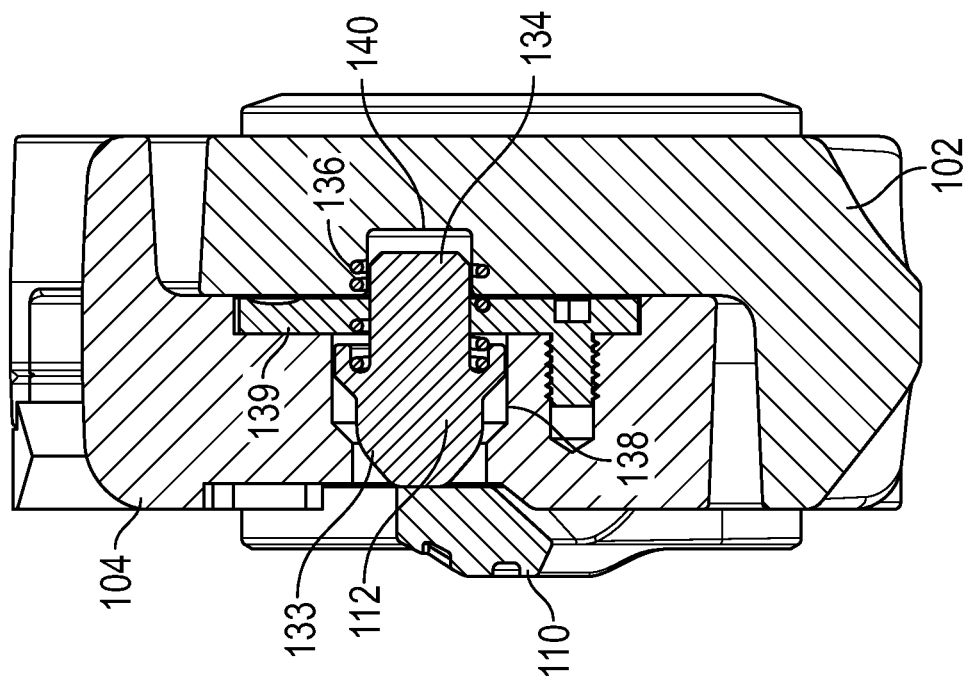
FIG. 21 is a section view of the multi-functional pliers of FIG. 20 taken along line 21-21.
Figure 20:
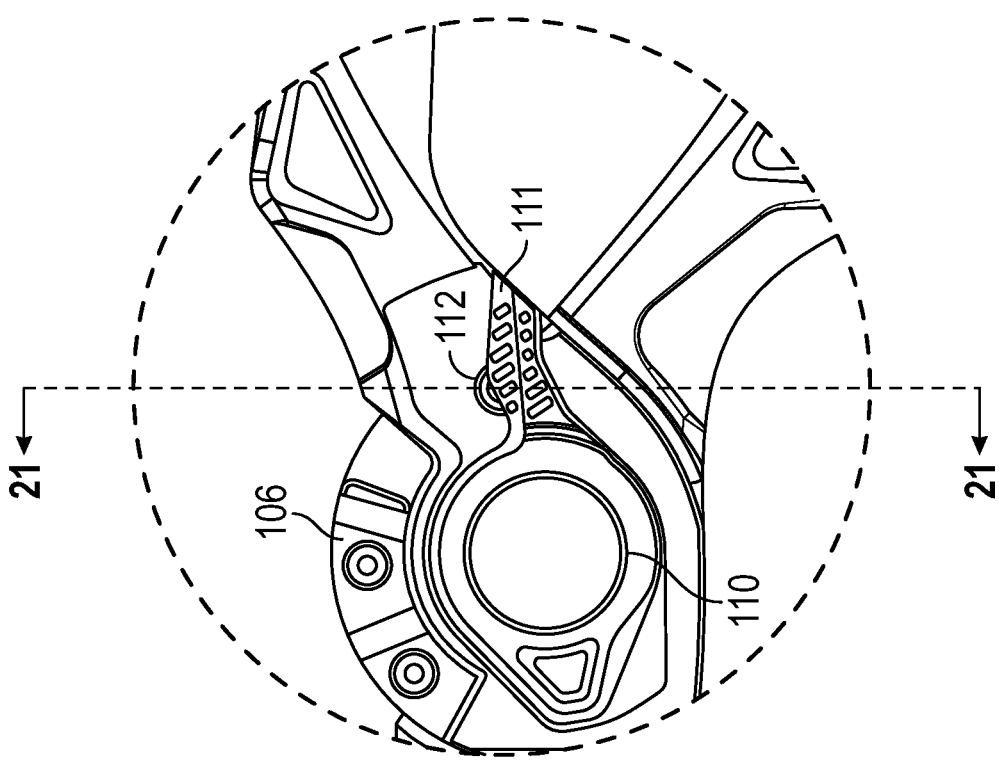
FIG. 20 is a more detailed view of section 20 of the multi-functional pliers of FIG. 19.

Referring to FIGS. 19-21, when the lock ring 110 is in an engaged position, the lock ring 110 covers or partially covers the locking mechanism 112 and the locking mechanism 112 is not exposed. The projection 111 of the lock ring 110 ensures that the locking mechanism 112 remains in a locked position such that the bottom portion 134 of the locking mechanism 112 is inserted into and engaged with the pocket 140 of the first handle 102. Accordingly, with the lock ring 110 engaged, the handles 102, 104 are locked in a closed position.

As shown in FIGS. 16-21, the projection 111 of the lock ring 110 and the top portion 133 of the locking mechanism 112 have corresponding chamfers that contact one another as the lock ring 110 is engaged. As the lock ring 110 rotates, the chamfered surfaces push against each other, directing a portion of the force used to rotate the lock ring 110 into the locking mechanism 112. This portion of the force pushes the locking mechanism 112 toward the locked position. The mating chamfered surfaces facilitate automatic locking as the lock ring 110 is engaged.

In this configuration, the lock ring 110 may not be necessary to hold the locking mechanism 112 in place, but acts as a backup feature. For example, if the pliers 100 were left unattended, the pliers could not be opened to reveal the pliers or the cutting inserts 106 unless the lock ring 110 was moved out of engagement. As another example, if the pliers 100 are dropped, the lock ring 110 would hold the locking mechanism 112 in a locked position such that the handles 102, 104 stay closed.

In an exemplary embodiment, a user can disassemble the lock ring 110 from the pliers 100 without disassembling the other components of the pliers 100. For example, a user may wish to remove the lock ring 110 to clean the portions covered by the lock ring 110 that may have been clogged with debris or other items. Unlike conventional pliers with a lock mechanism, the pliers 100 allow a user to remove a portion of the locking assembly without dismantling the locking mechanism 112 or any other pieces of the pliers 100.

It is important to note that the construction and arrangement of the multi-functional pliers as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. While the detailed drawings, specific examples, and particular formulations given describe certain exemplary embodiments, they serve the purpose as illustration only. The invention is not limited to the specific forms shown. The configuration of multi-function tool may differ depending on chosen performance characteristics and physical characteristics of the components of the multi-function tool. For example, the implement may take a variety of configurations and perform different functions depending on the needs of the user. Furthermore, other substitutions, modifications, changes, and omissions may be made in the design, operating conditions, and arrangement of the exemplary embodiments without departing from the scope of the invention as expressed in the appended claims. Elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

What is claimed is:

1. A multi-function tool, comprising:
   a first handle including a pocket having a pocket wall;
   a second handle including an aperture extending from an outside face of the second handle to an inside face of the second handle, wherein the first handle is pivotally coupled to the second handle, and wherein the first handle and the second handle move between an open position and a closed position relative to each other;
   a lock button movable between an unlocked position and a locked position, wherein the lock button includes a top portion configured to engage a portion of the aperture proximate the outside face, a bottom portion, and a shoulder, wherein the shoulder is positioned between the top portion and the bottom portion, wherein a portion of the aperture proximate the outside face is smaller than the shoulder to hold a first portion of the lock button within the aperture;
   a lock plate coupled to the second handle proximate the inside face and configured to hold a second portion of the lock button within the aperture; and
   a biasing member configured to bias the lock button toward the unlocked position, wherein the biasing member is positioned on the bottom portion of the lock button between the lock plate and the shoulder;
   wherein when in the locked position, the bottom portion of the lock button is slidably engaged with the pocket wall to lock the first handle and the second handle in the closed position.

2. The multi-function tool of claim 1, further comprising a second biasing member configured to bias the first handle and the second handle toward the open position, wherein when the bottom portion is in contact with the pocket wall, the lock button remains in the locked position.

3. The multi-function tool of claim 1, further comprising a lock ring including a body and a protrusion extending outward from the body, wherein when engaged, the protrusion covers the lock button in the locked position.

* * * * *